Patented Nov. 21, 1939

2,181,085

UNITED STATES PATENT OFFICE 2,181,085

ETHER

Francis N. Alquist and Harold R. Slagh, Midland, Mich., assignors to The Dow Chemical Company, Midland, Mich., a corporation of Michigan No Drawing. Application August 17, 1938, Serial No. 225,418

6 Claims. (Cl. 260—348)

This invention relates to ethers of substituted phenols and is particularly concerned with those compounds having the following formula

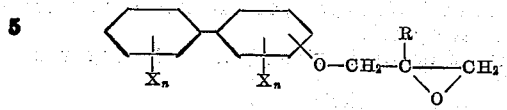

wherein each X represents hydrogen or a substituent nonreactive in the etherification reaction such as chlorine, bromine, nitro-, alkyl, aralkyl, cycloalkyl, alkoxy, carboalkoxy, etc., R represents hydrogen or the methyl radical, and $n$ is an integer not greater than 2.

In preparing these new compounds, we generally react 1-chloro-propylene-oxide-2,3 or 1-chloro-2-methyl-propylene-oxide-2,3 with an aqueous solution of an alkali metal salt of a suitable phenylphenol compound. The reaction mixture is stirred and warmed at a temperature between 60° C. and the refluxing temperature thereof until the reaction is substantially complete. The mixture is then cooled, the crude ether product separated therefrom as by decantation, extraction, or filtration, and thereafter fractionally distilled to obtain the desired ethers in substantially pure form. An alternative procedure consists of reacting metallic sodium with a phenyl-phenol dissolved in a suitable water-free organic solvent such as benzene, and subsequently heating the reaction mixture with a chloro-propylene-oxide compound to form the desired compound.

The ethers, as obtained above, are high-boiling complex derivatives varying in nature from viscous liquids to white crystalline solids. They are substantially insoluble in water but somewhat soluble in most organic solvents. They may be hydrolyzed with acid to give the corresponding glycol derivatives.

The following examples describe in detail the preparation of certain individual members of our new class of compounds, but are not to be construed as limiting the invention.

Example 1

170 grams (1.0 mole) of 2-phenylphenol, 42 grams (1.0 mole) of 95 per cent by weight solid sodium hydroxide, and 300 milliliters of water were mixed together and warmed to a temperature of 60° C., whereby a solution of sodium-2-phenylphenolate was obtained. This solution was added portion-wise with stirring to 139 grams (1.5 moles) of 1-chloro-propylene-oxide-2,3 at temperatures gradually increasing from 60° to 70° C. over a period of one hour. Following the addition of the phenolate solution, the reaction mixture was held at 60°–70° C. for an additional hour and thereafter cooled, whereupon the ether product separated out as a water-immiscible layer. This crude product was recovered by decantation, dried, and fractionally distilled, whereby there was obtained 170 grams of 1-(2-phenylphenoxy)-propylene-oxide-2,3 as a viscous liquid boiling at 190°–200° C. at 0.5 inch pressure.

Example 2

In a similar manner, 85 grams (0.5 mole) of 3-phenylphenol, 21 grams (0.05 mole) of sodium hydroxide, and 150 milliliters of water were reacted with 69.5 grams (0.75 mole) of 1-chloro-propylene-oxide-2,3 at temperatures ranging between 70° and 84° C. Fractional distillation of the crude ether product so obtained resulted in the isolation of 62 grams of 1-(3-phenyl-phenoxy)-propylene-oxide-2,3 as a colorless liquid boiling at 195°–203° C. at 0.1 inch and having a specific gravity of 1.158 at 25°/25° C.

Example 3

85 grams (0.5 mole) of 4-phenylphenol, 21 grams of sodium hydroxide, and 150 milliliters of water were reacted with 69.5 grams (0.75 mole) of 1-chloro-propylene-oxide-2,3 at 75°–85° C. substantially as described in Example 1. Upon fractional distillation of the crude ether product, there was obtained 59 grams of 1-(4-phenyl-phenoxy)-propylene-oxide-2,3 as a white, crystalline solid boiling at 196°–201° C. at 0.1 inch and having a melting point of 91° C.

Example 4

In a like manner, 0.5 mole of 2'-bromo-4-phenylphenol was reacted with 0.75 mole of 1-chloro-propylene-oxide-2,3 in alkaline solution at a temperature of 74°–81° C. The reaction mixture was extracted with ethylene chloride, the extract separated and dried and fractionally distilled, whereby there was obtained 77 grams of 1-(2'-bromo-4-phenyl-phenoxy)-propylene - oxide - 2,3 as a white powder boiling at 230°–241° C. at 0.2 inch and melting at 88° C.

Example 5

Similarly, 1-(2-chloro - 4 - phenyl - phenoxy)-propylene-oxide-2,3 was prepared by reacting 0.5 molar amounts each of 2-chloro-4-phenyl-phenol and sodium hydroxide in aqueous solution with 0.75 mole of 1-chloro-propylene-oxide-2,3. This ether compound boiled at 212°–214° C. at 0.1 inch pressure and had a melting point of 75° C.

In a like manner, the phenyl-phenols and their nuclear-substituted derivatives may be reacted with 1-chloro-2-methyl-propylene-oxide-2,3, i. e., chloro-iso-butylene-oxide, to produce homologous 1-(aryloxy)-2-methyl-propylene-oxide-2,3, such as 1-(2-phenyl-phenoxy)-2-methyl-propylene-oxide-2,3, and the like. These compounds are similar in characteristic to those disclosed above.

By substituting other phenylphenol compounds for those shown in the examples, there may be obtained the corresponding ethers of 2.6-dichloro-4-phenylphenol, 4-bromo-6-phenylphenol, 3-chloro-6-phenylphenol, 2-tertiary-butyl-4-phenylphenol, 2-normal-octyl-6-phenylphenol, 2-benzyl-6-phenylphenol, 2-(delta-phenyl-butyl)-4-phenylphenol, 4-cyclohexyl-6-phenylphenol, 2-methoxy-4-phenylphenol, 4-cyclopentyl-6-phenylphenol, 2-ethenyl-4-phenylphenol, 2.4-dinitro-6-phenylphenol, 2-chloro-4-phenyl-6-methyl-phenol, 2.4-dimethyl-6-phenylphenol, 2.4'-dichloro-4-phenylphenol, 2'.4'.6-tribromo-4-phenylphenol, 4'-isopropyl-6-methyl-4-phenylphenol, 2'-ethoxy-4-iodo-6-phenylphenol, and the like.

Petroleum distillate solutions of the above-described ethers have been found of value as fly spray materials. For example, a 3 per cent solution of 1-(2-phenyl-phenoxy)-propylene-oxide-2,3 in kerosene, when tested by the Peet-Grady method, substantially as described in Soap, 8, No. 4, 1932, was found to give better than an 80 per cent knockdown of three-day old house flies in 10 minutes. A 3 per cent solution of 1-3-phenyl-phenoxy)-propylene-oxide-2,3, when similarly tested, knocked down approximately 60 per cent and killed 33 per cent in 48 hours.

We claim:

1. An ether having the formula

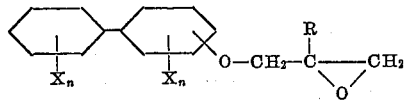

wherein each X represents a member of the group consisting of the chlorine, bromine, iodine, nitro, alkyl, alkenyl, aralkyl, cycloalkyl, alkoxy, carboalkoxy radicals and hydrogen, R represents a member of the group consisting of hydrogen and the methyl radical, and $n$ is an integer not greater than 2.

2. An ether having the formula

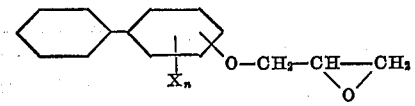

wherein X represents a member of the group consisting of the chlorine, bromine, iodine, nitro, alkyl, alkenyl, aralkyl, cycloalkyl, alkoxy, carboalkoxy radicals and hydrogen, and $n$ is an integer not greater than 2.

3. An ether of a phenylphenol having the formula

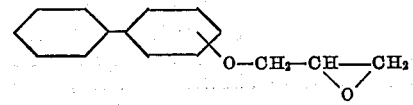

4. 1-(2-phenyl-phenoxy)-propylene-oxide-2,3.
5. 1-(3-phenyl-phenoxy)-propylene-oxide-2,3.
6. 1-(4-phenyl-phenoxy)-propylene-oxide-2,3.

FRANCIS N. ALQUIST.
HAROLD R. SLAGH.